(12) United States Patent
Cao et al.

(10) Patent No.: US 12,353,110 B2
(45) Date of Patent: Jul. 8, 2025

(54) CONTROL METHOD, APPARATUS AND EQUIPMENT FOR ELECTROCHROMIC DEVICE, AND STORAGE MEDIUM (71) Applicant: SHENZHEN GUANGYI TECH CO., LTD., Shenzhen (CN)

(72) Inventors: Chaoyue Cao, Shenzhen (CN); Jiazhi He, Shenzhen (CN)

(73) Assignee: SHENZHEN GUANGYI TECH CO., LTD. (CN)

( * ) Notice: Subject to any disclaimer, the term of this patent is extended or adjusted under 35 U.S.C. 154(b) by 483 days.

(21) Appl. No.: 17/783,257

(22) PCT Filed: Dec. 14, 2020

(86) PCT No.: PCT/CN2020/135999
§ 371 (c)(1),
(2) Date: Jun. 7, 2022

(87) PCT Pub. No.: WO2021/121171
PCT Pub. Date: Jun. 24, 2021

(65) Prior Publication Data
US 2023/0036063 A1    Feb. 2, 2023

(30) Foreign Application Priority Data
Dec. 17, 2019 (CN) .......................... 201911305034.0

(51) Int. Cl.
G02F 1/163 (2006.01)
G09G 3/19 (2006.01)
(52) U.S. Cl.
CPC ............... *G02F 1/163* (2013.01); *G09G 3/19* (2013.01); *G09G 2330/12* (2013.01)
(58) Field of Classification Search
CPC ....... G02F 1/163; G09G 3/19; G09G 2330/12
(Continued)

(56) References Cited

U.S. PATENT DOCUMENTS

2010/0172010 A1\* 7/2010 Gustavsson ............. G02F 1/163
359/265
2019/0324342 A1   10/2019 Jack et al.

FOREIGN PATENT DOCUMENTS

CN    101707892 A    5/2010
CN    104597682 A    5/2015
(Continued)

OTHER PUBLICATIONS

International Search Report for PCT Application No. PCT/CN2020/135999, dated Mar. 12, 2021, 5 pages.
(Continued)

*Primary Examiner* — William Choi
(74) *Attorney, Agent, or Firm* — Dickinson Wright PLLC (57) ABSTRACT A control method for the an electrochromic device includes: determining whether a current transmittance of the electrochromic device reaches a preset transmittance; when determining that the current transmittance does not reach the preset transmittance, controlling an external power supply to perform a first mode charging and discharging on the electrochromic device until the current transmittance reaches the preset transmittance; when determining that the current transmittance reaches the preset transmittance, suspending the charging and discharging, and continuously monitoring whether a current open circuit potential of the electrochromic device is within a preset open circuit potential threshold range; and if the current open circuit potential is not within the preset open circuit potential threshold range, controlling the external power supply to perform a second mode charging and discharging on the electrochromic device to enable the current open circuit potential to be continuously within the preset open circuit potential threshold range.

16 Claims, 3 Drawing Sheets (58) Field of Classification Search
USPC .......................................................... 359/265
See application file for complete search history.

(56) References Cited

FOREIGN PATENT DOCUMENTS

| | | | |
|---|---|---|---|
| CN | 106940508 A | | 7/2017 |
| CN | 107835958 A | | 3/2018 |
| CN | 108352144 A | | 7/2018 |
| CN | 108780260 A | | 11/2018 |
| CN | 109375446 A | | 2/2019 |
| CN | 110989262 A | | 4/2020 |
| JP | 2002229072 A | | 8/2002 |
| JP | 2016218437 A | * | 12/2016 |
| WO | 2004003649 A1 | | 1/2004 |

OTHER PUBLICATIONS

Search Report for Chinese Application No. 2019113050340, dated Mar. 25, 2021, 2 pages.
First Office Action for Chinese Application No. 2019113050340, dated Apr. 25, 2021, 22 pages.

* cited by examiner

CONTROL METHOD, APPARATUS AND EQUIPMENT FOR ELECTROCHROMIC DEVICE, AND STORAGE MEDIUM

CROSS-REFERENCE TO RELATED APPLICATION(S)

This application is a U.S. National Stage Application, filed under 35 U.S.C. 371, of International Patent Application No. PCT/CN2020/135999, filed on Dec. 14, 2020, which claims priority to Chinese Patent Application No. 201911305034.0, filed with the China National Intellectual Property Administration (CNIPA) on Dec. 17, 2019, the contents of which are incorporated herein by reference in their entireties.

TECHNICAL FIELD

The present application relates to the technical field of an electrochromic device, and for example, a control method, apparatus and equipment for an electrochromic device and a storage medium.

BACKGROUND

An electrochromic device needs to control the reversible electrochemical redox reaction of materials in the electrochromic device through an external applied voltage or an external applied current, so that the transmittance or the reflectivity of the device can be adjusted. In common use, the charging and discharging are often achieved using a constant voltage (using a specific voltage for a certain time) or a constant current (using a specific current for a certain time). A simple charging and discharging manner brings a series of problems, such as uneven color change, slow color change speed, short cycle life and the like of the device.

In the related art, a constant current charging and discharging manner is generally adopted, and the transmittance of the device is controlled by monitoring induced potentials reached by two points in the electrochromic device during the charging or calculating a total charge number of the charging and discharging. When the induced potential reaches a set value, the induced potential of the electrochromic device is kept unchanged by continuously applying the constant voltage to the device, so that the transmittance of the device is kept unchanged. The related art has the defects that an electrode must be led out from the electrochromic device to monitor the induced potential during the charging and discharging, reaction currents generated by two electrodes of the device are used for monitoring and calculating reaction charges, and therefore a logic judgment is performed. Furthermore, when a continuous constant voltage is applied, a potential distribution on a transparent conductive electrode is non-uniform, and a potential near two input electrodes of the power supply is high, so that two electrode regions of the power supply firstly change color, and the color-changing material cannot have enough voltage to react due to a fact that an internal resistance of the transparent conductive electrode is large and a potential at a position away from the electrodes is low; that is, the transmittance of the two electrode regions is inconsistent with the color change of the center region, the center may slowly reach the required transmittance through longer waiting time, the transmittance of the whole electrochromic device tends to be consistent, and the problem is generally referred to as the "iris effect". In order to uniformly change the color of the electrochromic device, a larger voltage is required to drive the electrochromic device, so that a potential of an edge region of the device is higher than a stable potential of the material itself, a situation of unstable degradation of the edge of the device is caused, and the instability of the device is greatly increased due to the continuous constant voltage.

SUMMARY

The present application provides a control method, apparatus and equipment for an electrochromic device and a storage medium, to realize the uniform color change and the prolonged service life of the electrochromic device.

Provided is a control method for an electrochromic device. The method includes the following steps: it is determined whether a current transmittance of the electrochromic device reaches a preset transmittance; in response to determining that the current transmittance of the electrochromic device does not reach the preset transmittance, an external power supply is controlled to perform a first mode charging and discharging on the electrochromic device until the current transmittance of the electrochromic device reaches the preset transmittance; in response to determining that the current transmittance of the electrochromic device reaches the preset transmittance, the charging and discharging is suspended, and it is continuously monitored whether a current open circuit potential of the electrochromic device is within a preset open circuit potential threshold range; and in response to the current open circuit potential of the electrochromic device being not within the preset open circuit potential threshold range, the external power supply is controlled to perform a second mode charging and discharging on the electrochromic device to enable the current open circuit potential of the electrochromic device to be continuously within the preset open circuit potential threshold range.

Further provided is a control apparatus for an electrochromic device. The apparatus includes a determination module, a first charging and discharging module, a potential determination module and a second charging and discharging module. The determination module is configured to determine whether a current transmittance of the electrochromic device reaches a preset transmittance. The first charging and discharging module is configured to, in response to determining that the current transmittance of the electrochromic device does not reach the preset transmittance, control an external power supply to perform a first mode charging and discharging on the electrochromic device until the current transmittance of the electrochromic device reaches the preset transmittance. The potential determination module is configured to, in response to determining that the current transmittance of the electrochromic device reaches the preset transmittance, suspend the charging and discharging, continuously monitor whether a current open circuit potential of the electrochromic device is within a preset open circuit potential threshold range. The second charging and discharging module is configured to, in response to the current open circuit potential of the electrochromic device being not within the preset open circuit potential threshold range, control the external power supply to perform a second mode charging and discharging on the electrochromic device to enable the current open circuit potential of the electrochromic device to be continuously within the preset open circuit potential threshold range.

Further provided is a dimming device. The dimming device includes at least one processor and a storage apparatus. The storage apparatus is configured to store at least one program. The at least one program, when executed by the at least one processor, causes the at least one processor to implement the control method for the electrochromic device described above.

Further provided is a computer-readable storage medium. The storage medium stores a computer program, where the computer program includes a program instruction, and the program instruction, when executed by a processor, implements the control method for the electrochromic device described above.

DETAILED DESCRIPTION

The present application will now be described with reference to the accompanying drawings and embodiments.

Before exemplary embodiments are discussed, it should be noted that some exemplary embodiments are described as processes or methods depicted as flowcharts. Although the flowchart describes multiple steps as a sequential process, many of the steps may be implemented in parallel, concurrently or simultaneously. Moreover, the order of the multiple steps may be rearranged. The process may be terminated when its operations are completed, but may also have additional steps not included in the accompanying drawings. The process may correspond to a method, a function, a procedure, a subroutine, a subprogram and the like.

Furthermore, the terms "first" "second" and the like may be used herein for describing various directions, actions, steps, or elements, but these directions, actions, steps, or elements are not limited by these terms. These terms are only used for distinguishing first direction, action, step, or element from another direction, action, step, or element. For example, a first mode could be referred as a second mode, and similarly, a second mode could be referred as a first mode, without departing from the scope of the present disclosure. The first mode and the second mode are both modes, but they are not a same mode. The terms "first", "second" and the like are not to be construed as indicating or implying relative importance or as implicitly indicating a number of technical features indicated. Whereby, features defined as "first" or "second" may explicitly or implicitly include one or more of such features. In the description of the present application, "multiple" means at least two, such as two, three, unless otherwise defined.

Embodiment One

Figure 1:
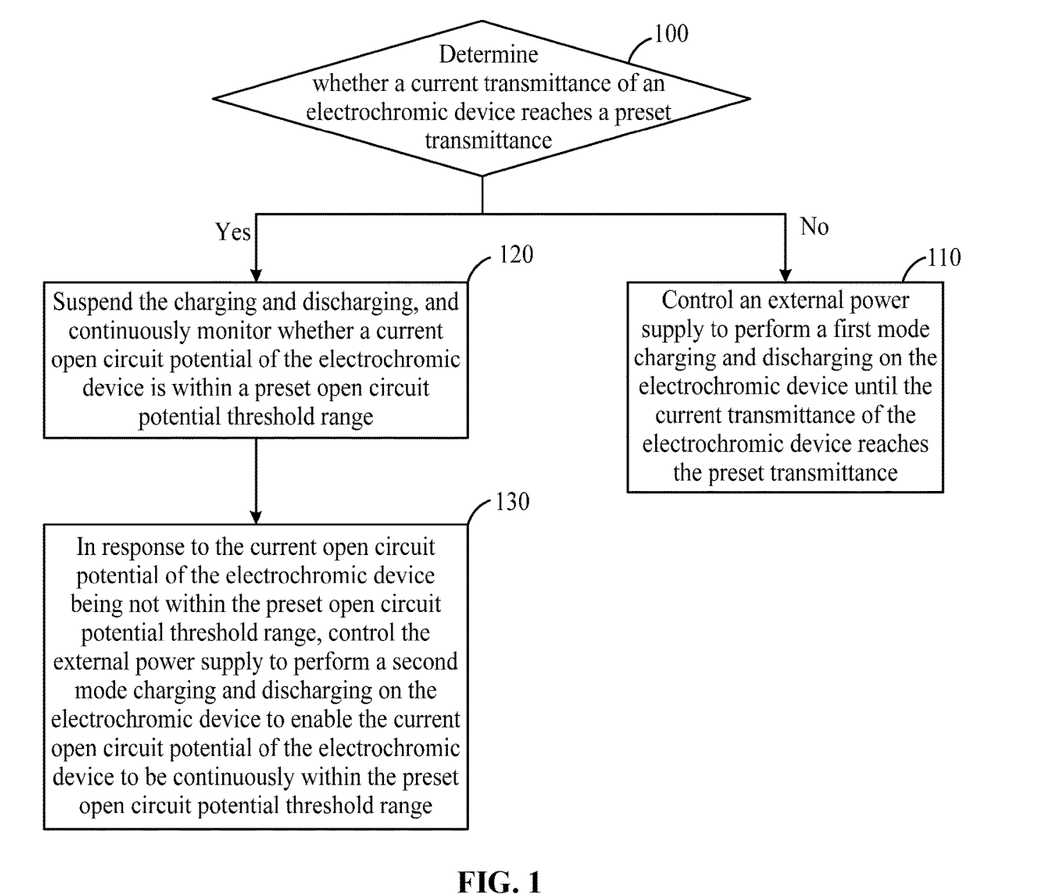
FIG. 1 is a flowchart of a control method for an electrochromic device provided in embodiment one of the present application.

FIG. 1 is a flowchart of a control method for an electrochromic device provided in embodiment one of the present application, this embodiment is applicable to a case of controlling a transmittance of the electrochromic device to be stable, and the method includes the following steps.

In step 100, it is determined whether a current transmittance of the electrochromic device reaches a preset transmittance.

In this embodiment, the electrochromic device may be configured as various dimming apparatuses such as electrochromic rearview mirrors, electrochromic intelligent windows, electrochromic glasses. Materials in the electrochromic device are controlled to generate reversible electrochemical oxidation and reduction through an external applied voltage or current to the electrochromic device, so as to change the transmittance of the resistive electrochromic device. In some cases, the current transmittance of the electrochromic device may be changed due to some factors, such as ambient temperature change, device use duration, which causes the situation that the current transmittance of the electrochromic device cannot reach the preset transmittance; or in other cases, when the value of the preset transmittance is adjusted, the current transmittance of the electrochromic device cannot reach the preset transmittance. Therefore, there is a need to monitor in real time whether the current transmittance of the electrochromic device is within a range of the preset transmittance.

In step 110, if the current transmittance of the electrochromic device does not reach the preset transmittance, an external power supply is controlled to perform a first mode charging and discharging on the electrochromic device until the current transmittance of the electrochromic device reaches the preset transmittance.

In this embodiment, if the current electrochromic device does not reach the preset transmittance, the external power supply needs to be controlled to perform the first mode charging and discharging on the electrochromic device, and the electrochromic device is controlled to reach the preset transmittance.

The first mode charging and discharging or the second mode charging and discharging includes at least one of: a constant voltage charging and discharging, a constant current charging and discharging, a pulse charging and discharging, and a sweeping speed charging and discharging.

The pulse charging and discharging includes multiple pulse segments and multiple intermittent segments, the multiple pulse segments and the multiple intermittent segments are distributed at intervals, and the duration of each pulse segment and the duration of each intermittent segment are short and are respectively within 0.001 s to 20 s. During the pulse segment, a charging and discharging may be performed with a conventional voltage within an electrochemical stable window, or with a high voltage above the electrochemical stable window (e.g., 2V to 40V), or with a conventional current (e.g., a conventional current less than 1 A/m$^2$), or with a high current (e.g., 1 A/m$^2$ to 100 A/m$^2$). During the intermittent segment, the charging and discharging may be temporarily stopped, or the charging and discharging may be performed by adopting voltage or current in a direction opposite to that of the pulse segment.

The sweeping-speed charging and discharging is that a partial pressure of the electrochromic device is gradually increased at an initial charging stage until the partial pressure is increased to a preset voltage, and then a constant voltage charging is performed. The sweeping speed charging and discharging of the electrochromic device by the external power supply may be realized by connecting a fixed resistor in series with the electrochromic device in a circuit. When the electrochromic device is in a complete discharging state, an internal resistance of the electrochromic device may be regarded as "0", and the fixed resistor in the circuit shares a circuit voltage. Along with the charging process, the internal resistance of the electrochromic device is increased, the voltage division of the electrochromic device in the circuit is gradually increased, and finally, the internal resistance of the electrochromic device may be regarded as infinity to share all voltages in the circuit so as to form the constant voltage charging.

In this embodiment, the following multiple charging and discharging forms may be obtained according to the permutation combination of at least one of: the constant voltage charging and discharging, the constant current charging and discharging, the pulse charging and discharging, and the sweeping speed charging and discharging so as to charge the electrochromic device, so that the effect of maintaining the specific transmittance of the electrochromic device is achieved, the electrochromic device is uniform in color change, and the service life is greatly prolonged. The multiple charging and discharging forms are as follows: the constant voltage charging and discharging; instantaneous high voltage and constant voltage charging and discharging; instantaneous high current and constant voltage charging and discharging; constant current charging and discharging; instantaneous high voltage and constant current charging and discharging; instantaneous high current and constant current charging and discharging; a cycle of forward constant voltage charging and discharging—open circuit or reverse constant voltage charging and discharging for a certain time—constant voltage charging and discharging; a cycle of forward constant voltage charging and discharging—open circuit or reverse constant current charging and discharging for a certain time—constant voltage charging and discharging; a cycle of forward constant current charging and discharging—open circuit or reverse constant voltage charging and discharging for a certain time—constant current charging and discharging; and a cycle of forward constant current charging and discharging—open circuit or reverse constant current charging and discharging for a certain time—a constant current charging and discharging or a sweeping speed charging and discharging.

In this embodiment, the method for determining that the current transmittance of the electrochromic device reaches the preset transmittance includes: a charging and discharging charge number of the electrochromic device reaches a preset value, constant voltage or constant current output time of the electrochromic device reaches a preset time or output current of the electrochromic device is less than a preset cut-off current.

In this embodiment, through the method for determining that the current transmittance reaches the preset transmittance, it may be accurately determined whether the electrochromic device reaches the preset transmittance when the electrochromic device is charged by adopting different charging and discharging modes.

In this embodiment, whether the electrochromic device needs to be charged and discharged through multiple charging and discharging manners such as a constant current and a constant voltage to maintain a certain transmittance is determined according to an open circuit potential of the electrochromic device, so that the transmittance range of the electrochromic device is accurately adjusted. (The transmittance is adjusted to a lower state from a higher state or is adjusted to a higher transmittance from a lower transmittance), the electrochromic logic control panel outputs a forward or reverse voltage or current to the electrochromic device to enable the electrochromic device to generate an oxidation-reduction reaction so as to change a transmittance state of the electrochromic device. The electrochromic logic control panel determines when to stop the output according to the calculated number of transmitted charges or according to the detection of the open circuit potential in the electrochromic device, so that the effect of adjusting the transmittance range of the electrochromic device is achieved, and meanwhile, the electrochromic device is protected and prevented from being overcharged and overdischarged. In order to achieve these purposes, the logic control panel needs to be provided with a voltage detection sensor for detecting the open circuit potential of the electrochromic device. After receiving an instruction to adjust the transmittance of the electrochromic device (darkening or brightening), the logic control panel inputs the voltage or current to the electrochromic device. Moreover, a current integrator detects the current transmitted to the electrochromic device and calculates the number of charges, and when the number of charges satisfies the set number of charges, the voltage or current output is stopped. In some cases, when the electrochromic device is at or assumed to be at a specified required transmittance range, the voltage or current output is stopped. In some cases, when the electrochromic device reaches a specified open circuit potential level or is in a specified open circuit potential level range, the voltage or current output is stopped. In some cases, the output of the power supply is stopped after a constant voltage or constant current is output for a prescribed period of time. In order to keep the electrochromic device in a specified transmittance range until an instruction to change the transmittance range of the electrochromic device next time is received, in some cases, when the number of transmitted charges reaches a required threshold or the open circuit potential of the electrochromic device reaches a set threshold, the output is changed to be a constant voltage output at a target voltage, so that the electrochromic device is always maintained under the target voltage to satisfy the requirement of maintaining the transmittance state until the instruction to adjust the transmittance of the electrochromic device is given again. Or, when the number of transmitted charges reaches a required threshold or the open circuit potential of the electrochromic device reaches a set threshold, the voltage or current output is stopped, and a voltage sensor continuously detects the change of the open circuit potential in the electrochromic device, and a current open circuit potential of the electrochromic device is controlled to be maintained within a preset open circuit potential threshold range. In an embodiment, when the current open circuit potential of the electrochromic device is higher than a preset balance potential of the electrochromic device and the attenuation of the open circuit potential reaches a set minimum threshold, the electrochromic device is charged again in a second mode; and the voltage or current output is stopped until the current open circuit potential of the electrochromic device reaches the upper limit of the preset open circuit potential threshold range, and the step is repeated until the instruction to adjust the transmittance is obtained again. Or when the current open circuit potential of the electrochromic device is lower than the preset balance potential of the electrochromic device, if the current open circuit potential of the electrochromic device is higher than the upper limit of the preset open circuit potential threshold range, then the second mode is adopted for discharging, and the discharging is stopped until the current open circuit potential is lower than the lower limit of the preset open circuit potential threshold range; and the step is repeated until the instruction to adjust the transmittance is obtained again.

The following is the determination and implementation process of each of multiple charging and discharging modes.

A constant voltage charging and discharging mode: the external power supply performs a constant voltage charging and discharging on the electrochromic device. 1a, in some cases, a current generated by the electrochromic device under the constant voltage is detected through an integrator, and the number of charges is calculated; and when the number of charges satisfies the set number of charges, the charging and discharging of the electrochromic device is stopped. 1b, in some cases, when the electrochromic device reaches a prescribed required transmittance, the charging and discharging of the electrochromic device is stopped. 1c, in some cases, the charging and discharging of the electrochromic device is stopped after the output is performed for a prescribed period of time $T_n$ (e.g. 0.01 s<$T_n$<1000 s). 1d, in some cases, the current is detected after the output is performed for the prescribed period of time, and when the current of the electrochromic device reaches a set value or range of a preset cut-off current $I_t$ (e.g., 0.1 A/m$^2$≤$I_t$≤10 A/m$^2$), the charging and discharging of the power supply is stopped. In some cases, multiple detections are performed, when indexes in one or any of the items 1a-1d reach a set value, the charging and discharging of the electrochromic device is stopped.

A constant current charging and discharging mode: the external power supply performs a constant current charging and discharging on the electrochromic device. 4a, in some cases, the current input by the power supply to the electrochromic device is detected through an integrator, and the number of charges is calculated; and when the number of charges satisfies the set number of charges, the charging and discharging of the electrochromic device is stopped. 4b, in some cases, when the electrochromic device reaches the specified required transmittance range, the charging and discharging of the electrochromic device is stopped. 4c, in some cases, the charging and discharging of the electrochromic device is stopped after the output is performed for the prescribed period of time. 4d, in some cases, the voltage is detected after the output is performed for the prescribed period of time, and when the voltage of the electrochromic device reaches a set value or range of a constant current charging and discharging cut-off voltage, the charging and discharging of the electrochromic device is stopped. In some cases, multiple detections are performed, and when indexes in one or any of the above items 4a-4d reach a set value, the charging and discharging of the power supply is stopped.

The effect and the theoretical basis of the present application for enabling the electrochromic device to rapidly change color are described below in combination with a charging and discharging mode. For a general inorganic electrochromic device, in order to avoid damage to the electrochromic device and prolong the service life of the electrochromic device, a smaller input voltage or current is usually applied, so that the color change speed of the electrochromic device is slower. For an electrochromic device with a large size, the color change time is 30 minutes. In order to improve a color changing speed of a product of the electrochromic device, for a super-capacitor-like electrochromic device, the charging voltage or the charging current may be higher than an electrochemical window voltage in a short time, namely, a pulse charging manner is used, and a large amount of charges are charged in a short time, so that the transmittance of the electrochromic device is rapidly changed in a short time. This is due to a fact that the electrochemistry of the super-capacitor-like electrochromic device is generally composed of a double-electron-layer capacitor and a Faraday pseudocapacitor. Pseudocapacitance is characterized in that adsorbed ions do not undergo an electrochemical reaction (redox reaction) with atoms on the electrode, but rather a charge transfer occurs. Ions in the solution abut against the surface of the electrode in a physical adsorption manner, and chemical bonds are not generated or broken. This process is reversible and very rapid. A high voltage pulse charging manner is used for acting on the electrochromic device for a short time, although an input voltage is higher than an electrochemical stable window, an electrochromic material does not have an irreversible negative reaction in a short time; and due to the effect of charge transfer, the open circuit potential in the electrochromic device is increased, and the overall transmittance of the electrochromic device is greatly changed in a short time, so that the rapid color change of the electrochromic device may be realized on the premise of avoiding damage to the electrochromic device.

Exemplarily, the following charging and discharging modes combining pulse charging and discharging and constant voltage/constant current charging and discharging may be adopted, so that the effect of rapidly changing color of the electrochromic device is achieved while the electrochromic device is prevented from being damaged.

An instantaneous high voltage and constant voltage charging and discharging mode: the external power supply performs instantaneous high voltage and constant voltage charging and discharging on the electrochromic device, where the instantaneous high voltage is a high voltage (e.g. 2V to 40V) applied in a short time (0.001 s to 20 s) and above the electrochemical stable window of the electrochromic device. 2a, in some cases, in a short time (within 0.001 s to 20 s), the constant voltage charging and discharging is performed on the electrochromic device by using a high voltage (e.g. 2V to 40V) above the electrochemical stable window, and then a voltage in the electrochemical stable window is applied to the electrochromic device to perform a constant voltage $V_f$ (<2.0V) charging and discharging; the current generated by the electrochromic device in the pressurizing process is detected through an integrator and the number of charges is calculated; and when the number of charges satisfies the set number of charges, the charging and discharging of the electrochromic device is stopped. 2b, in some cases, in a short time (within 0.001 s to 20 s), the constant voltage charging and discharging is performed on the electrochromic device by using a high voltage (e.g. 2V to 40V) above an electrochemical stable window, and then a voltage within the electrochemical stable window is applied to the electrochromic device to perform the constant voltage $V_f$ (<2.0V) charging and discharging; and when the electrochromic device reaches a specified required transmittance range, the charging and discharging on the electrochromic device is stopped. 2c, in some cases, in a short time (within 0.001 s to 20 s), a constant voltage charging and discharging is performed on the electrochromic device by using a high voltage (e.g. 2V to 40V) above an electrochemical stable window, and then a voltage within the electrochemical stable window is applied to the electrochromic device to perform the constant voltage $V_f$ (<2.0V) charging and discharging; and the charging and discharging of the electrochromic device is stopped after the output is performed for the prescribed period of time. 2d, in some cases, in a short time (within 0.001 s to 20 s), the constant voltage charging and discharging is performed on the electrochromic device by using a high voltage (e.g. 2V to 40V) above an electrochemical stable window, and then a voltage in the electrochemical stable window is applied to the electrochromic device to perform the constant voltage $V_f$ (<2.0V) charging and discharging; the current is detected after the output is performed for the prescribed period of time, and when the current of the electrochromic device reaches a set value or a range of a preset cut-off current $I_t$, the charging and discharging of the electrochromic device is stopped. In some cases, multiple detections are performed, and when the index in one or any of the items 2a-2d reaches a set value, the charging and discharging of the power supply is stopped.

An instantaneous high current and constant current charging and discharging mode: the external power supply performs the instantaneous high current and constant voltage charging and discharging on the electrochromic device. 3a, in some cases, in a short time (within 0.001 s to 20 s), the constant current charging and discharging is performed on the electrochromic device by using a high current (e.g. 1 A/m² to 100 A/m²), and then a voltage in the electrochemical stable window is applied to the electrochromic device to perform a constant voltage (<2.0V) charging and discharging; the current generated by the electrochromic device in the pressurizing process is detected through an integrator and the number of charges is calculated, and when the number of charges satisfies the set number of charges, the charging and discharging of the electrochromic device is stopped. 3b, in some cases, in a short time (within 0.001 s to 20 s), the constant current charging and discharging is performed on the electrochromic device by using a high current (e.g. 1 A/m² to 100 A/m²), and then a voltage within the electrochemical stable window is applied to the electrochromic device to perform the constant voltage (<2.0V) charging and discharging, and when the electrochromic device reaches a specified required transmittance range, the charging and discharging on the electrochromic device is stopped. 3c, in some cases, in a short time (within 0.001 s to 20 s), a constant current charging and discharging is performed on the electrochromic device by using a high current (e.g. 1 A/m² to 100 A/m²), and then a voltage within the electrochemical stable window is applied to the electrochromic device to perform the constant voltage (<2.0V) charging and discharging, and the charging and discharging of the electrochromic device is stopped after the output is performed for the prescribed period of time. 3d, in some cases, in a short time (within 0.001 s to 20 s), the constant current charging and discharging is performed on the electrochromic device by using a high current (e.g. 1 A/m² to 100 A/m²), and then a voltage in the electrochemical stable window is applied to the electrochromic device to perform the constant voltage (<2.0V) charging and discharging; and the current is detected after the output is performed for the prescribed period of time, and when the current of the electrochromic device reaches a set value or a range of a constant voltage charging and discharging cut-off current $I_t$, the charging and discharging of the electrochromic device is stopped. In some cases, multiple detections are performed, and when the index in one or any of the items 3a-3d reaches a set value, the charging and discharging of the power supply is stopped.

An instantaneous high voltage and constant current charging and discharging mode, where the instantaneous high voltage is a high voltage (e.g. 2V to 40V) applied in a short time (0.001 s to 20 s) and above the electrochemical stable window of the electrochromic device: the external power supply performs the instantaneous high voltage and constant current charging and discharging on the electrochromic device. 5a, in some cases, in a short time (within 0.001 s to 20 s), the constant voltage charging and discharging is performed on the electrochromic device by using a high voltage (e.g. 2V to 40V) above the electrochemical stable window, and then the constant current charging and discharging is applied to the electrochromic device; the current input by the power supply to the electrochromic device is detected through an integrator and the number of charges is calculated, and when the number of charges satisfies the set number of charges, the charging and discharging of the electrochromic device is stopped. 5b, in some cases, in a short time (within 0.001 s to 20 s), the constant voltage charging and discharging is performed on the electrochromic device by using a high voltage (e.g. 2V to 40V) above the electrochemical stable window, and then the constant current charging and discharging is applied to the electrochromic device; and when the electrochromic device reaches a specified required transmittance range, the charging and discharging of the electrochromic device is stopped. 5c, in some cases, in a short time (within 0.001 s to 20 s), a constant voltage charging and discharging is performed on the electrochromic device by using a high voltage (e.g. 2V to 40V) above the electrochemical stable window, and then the constant current charging and discharging is applied to the electrochromic device; and the charging and discharging of the electrochromic device is stopped after the output is performed for the prescribed period of time (T4). 5d, in some cases, in a short time (within 0.001 s to 20 s), the constant voltage charging and discharging is performed on the device by using a high voltage (e.g. 2V to 40V) above the electrochemical stable window, and then the constant current charging and discharging is applied to the electrochromic device; the voltage is detected after the output is performed for the prescribed period of time, and when the voltage of the electrochromic device reaches a set value or ranges, the charging and discharging of the electrochromic device is stopped. In some cases, multiple detections are performed, and when the index in one or any of the items 5a-5d reaches a set value, the charging and discharging of the power supply is stopped.

An instantaneous high current and constant current charging and discharging mode: the external power supply performs an instantaneous high current and constant current charging and discharging on the electrochromic device. 6a, in some cases, in a short time (within 0.001 s to 20 s), the constant current charging and discharging is performed on the electrochromic device by using a high current (e.g. 1 A/m² to 100 A/m²), and then a conventional current (e.g. 0.01 A/m² to 1 A/m²) constant current charging and discharging is applied to the electrochromic device; the current input by the power supply to the electrochromic device is detected through an integrator and the number of charges is calculated, and when the number of charges satisfies the set number of charges, the charging and discharging of the electrochromic device is stopped. 6b, in some cases, in a short time (within 0.001 s to 20 s), the constant current charging and discharging is performed on the electrochromic device by using a high current (e.g. 1 A/m² to 100 A/m²), and then a low current (e.g. 0.01 A/m² to 1 A/m²) constant current charging and discharging is applied to the electrochromic device; and when the electrochromic device reaches a specified required transmittance range, the charging and discharging of the electrochromic device is stopped. 6c, in some cases, in a short time (within 0.001 s to 20 s), a constant current charging and discharging is performed on the electrochromic device by using a high current (e.g. 1 A/m² to 100 A/m²), and then a low current (e.g. 0.01 A/m² to 1 A/m²) constant current charging and discharging is applied to the electrochromic device; and the charging and discharging of the electrochromic device is stopped after the output is performed for the prescribed period of time. 6d, in some cases, in a short time (within 0.001 s to 20 s), the constant current charging and discharging is performed on the electrochromic device by using a high current (e.g. 1 A/m$^2$ to 100 A/m$^2$), and then a low current (e.g. 0.01 A/m$^2$ to 1 A/m$^2$) constant current charging and discharging is applied to the electrochromic device; and the voltage is detected after the output is performed for the prescribed period of time, and when the voltage of the electrochromic device reaches a set value or range of a preset cut-off voltage, the charging and discharging of the electrochromic device is stopped. In some cases, multiple detections are performed, and when the index in one or any of the items 6a-6d reaches a set value, the charging and discharging of the power supply is stopped.

The effect and the theoretical basis of the present application capable of enabling the electrochromic device to rapidly and uniformly change the color are described below in combination with the charging and discharging mode. The electrochromic device is generally formed by a "sandwich" structure consisting of two transparent conductive layers, an electrochromic material layer, an ion storage layer, and an intermediate electrolyte. For an electrochromic device with a smaller size, (such as an anti-glare rearview mirror), the entire color changing process can generally achieve the effect of the faster and uniform color changing. For an electrochromic device with a larger size (such as an electrochromic smart window), due to a fact that the capacity of the elecrochromic device is large and the electrodes have a farther distribution, long-time large-current charging is often needed to enable the transmittance of the electrochromic device to reach the set range. Since the internal voltage distribution of the electrochromic device is non-uniform and the potential difference between two ends of the electrode is too large, the electrochromic material in the electrode region of the electrochromic device changes color first, so that the transmittance of the electrochromic material in the electrode region is inconsistent with that in the center region, and a color changing trend is generated, which is referred to as an iris effect. As the potential difference in the electrochromic device is reduced, the transmittance of the whole electrochromic device gradually tends to be consistent. In the charging process of the electrochromic device, large current is often used for quick charging in order to accelerate the color changing speed, but since the current receiving degrees of different electrochromic materials are different, when the electrochromic device is charged by using the large current for a long time, the maximum voltage threshold may be quickly reached, and the electrochromic material near the two poles is extremely easy to generate excessive oxidation and irreversible reaction under overhigh voltage, which causes the electrochromic device to be damaged. Therefore, the constant voltage charging becomes a safer charging mode. However, the electrochromic device is always affected by the polarization effect generated by the electrochemistry in the electrochemical reaction process (charging or discharging), and the polarization is mainly represented as an electrochemical polarization, a concentration polarization, an ohmic polarization and the like. Due to the existence of the polarization effect, the inherent acceptable charging and discharging current of the electrochromic device is attenuated according to a certain form, so that the device cannot receive long-time large-current charging, and thus the charging speed is reduced. In the charging (oxidation) process of the electrochromic device, if output of an external power supply is suspended, electrochromic materials in the two poles regions of the electrochromic device may be reduced to a certain degree because after an external electric field disappears, potential in the electrochromic device is redistributed, a potential difference between the two poles and the central region disappears, and then the transmittance is kept consistent, however, the overall transmittance of the electrochromic device is increased along with the increase of charged charges. Therefore, the whole charging speed can be improved by properly stopping charging or adding large current for discharging in the charging process of the electrochromic device, or properly stopping charging or adding large current for charging in the discharging process of the electrochromic device.

Exemplarily, the following charging and discharging modes combining pulse charging and discharging and constant voltage/constant current charging and discharging may be adopted, so that the effect of the rapid and uniform color changing of the electrochromic device is achieved while the electrochromic device is prevented from being damaged.

Forward constant voltage charging and discharging-open circuit or reverse constant voltage charging and discharging for a certain time-constant voltage charging and discharging circulation mode: in this charging and discharging mode, the external power supply adopts a mode of combining a pulse charging and discharging and a constant voltage charging and discharging to charge and discharge the electrochromic device, where the pulse charging and discharging includes multiple pulse segments and multiple intermittent segments, the pulse segment adopts the forward constant voltage charging and discharging, and the intermittent segment adopts the open circuit or reverse constant voltage charging and discharging for a certain time. 7a, in some cases, a current generated by the electrochromic device under a constant voltage is detected through an integrator, and the number of charges is calculated; and when the number of charges satisfies the set number of charges, the charging and discharging of the electrochromic device is stopped. 7b, in some cases, when the electrochromic device reaches the specified required transmittance range, the charging and discharging of the electrochromic device is stopped. 7c, in some cases, the charging and discharging of the electrochromic device is stopped after the output is performed for the prescribed period of time. 7d, in some cases, the current is detected after the output is performed for the prescribed period of time, and when the current of the electrochromic device reaches a set value or range of a preset cut-off current, the charging and discharging of the electrochromic device is stopped. In some cases, multiple detections are performed, and when indexes in one or any of the items 7a-7d reach a set value, the charging and discharging of the power supply is stopped.

Forward constant voltage charging and discharging-open circuit or reverse constant current charging and discharging for a certain time-constant voltage charging and discharging circulation mode: in this charging and discharging mode, the external power supply adopts a mode of combining a pulse charging and discharging and a constant voltage charging and discharging to charge and discharge the electrochromic device, where the pulse charging and discharging includes multiple pulse segments and multiple intermittent segments, the pulse segment adopts the forward constant voltage charging and discharging, and the intermittent segment adopts the open circuit or reverse constant voltage charging and discharging for a certain time. 8a, in some cases, a current generated by the electrochromic device under a constant voltage is detected through an integrator, and the number of charges is calculated, and when the number of charges satisfies the set number of charges, the charging and discharging of the electrochromic device is stopped. 8b, in some cases, when the electrochromic device reaches the specified required transmittance range, the charging and discharging of the electrochromic device is stopped. 8c, in some cases, the charging and discharging of the electrochromic device is stopped after the output is performed for the prescribed period of time. 8d, in some cases, the current is detected after the output is performed for the prescribed period of time, and when the current of the electrochromic device reaches a set value or range of a preset cut-off current, the charging and discharging of the electrochromic device is stopped. In some cases, multiple detections are performed, and when indexes in one or any of the items 8a-8d reach a set value, the charging and discharging of the power supply is stopped.

Forward constant current charging and discharging-open circuit or reverse constant voltage charging and discharging for a certain time-constant current charging and discharging circulation mode: in this charging and discharging mode, the external power supply adopts a mode of combining a pulse charging and discharging and a constant current charging and discharging to charge and discharge the electrochromic device, where the pulse charging and discharging includes multiple pulse segments and multiple intermittent segments, the pulse segment adopts the forward constant current charging and discharging, and the intermittent segment adopts the open circuit or reverse constant voltage charging and discharging for a certain time. 9a, in some cases, a current input by the power supply to the electrochromic device is detected through an integrator, the number of charges is calculated, and when the number of charges satisfies the set number of charges, the charging and discharging of the electrochromic device is stopped. 9b, in some cases, when the electrochromic device reaches the specified required transmittance range, the charging and discharging of the electrochromic device is stopped. 9c, in some cases, the charging and discharging of the electrochromic device is stopped after the output is performed for the prescribed period of time. 9d, in some cases, the voltage is detected after the output is performed for the prescribed period of time, and when the voltage of the electrochromic device reaches a set value or range of a preset cut-off voltage, the charging and discharging of the electrochromic device is stopped. In some cases, multiple detections are performed, when indexes in one or any of the items 9a-9d reach a set value, the charging and discharging of the power supply is stopped.

Forward constant current charging and discharging-open circuit or reverse constant current charging and discharging for a certain time-constant current charging and discharging circulation mode: in this charging and discharging mode, the external power supply adopts a mode of combining a pulse charging and discharging and a constant current charging and discharging to charge and discharge the electrochromic device, where the pulse charging and discharging includes multiple pulse segments and multiple intermittent segments, the pulse segment adopts the forward constant current charging and discharging, and the intermittent segment adopts the open circuit or reverse constant voltage charging and discharging for a certain time. 10a, in some cases, a current input by the power supply to the electrochromic device is detected through an integrator, the number of charges is calculated, and when the number of charges satisfies the set number of charges, the charging and discharging of the electrochromic device is stopped. 10b, in some cases, when the electrochromic device reaches the specified required transmittance range, the charging and discharging of the electrochromic device is stopped. 10c, in some cases, the charging and discharging of the electrochromic device is stopped after the output is performed for the prescribed period of time. 10d, in some cases, the voltage is detected after the output is performed for the prescribed period of time, and when the voltage of the device reaches a set value or range, the charging and discharging of the electrochromic device is stopped. In some cases, multiple detections are performed, when indexes in one or any of the items 10a-10d reach a set value, the charging and discharging of the power supply is stopped.

The effect and the theoretical basis of the present application for enabling the electrochromic device to be uniform in color change are described below in combination with the charging and discharging mode.

Sweeping speed charging and discharging mode: the external power supply performs the sweeping speed charging and discharging on the electrochromic device, which is realized by connecting a fixed resistor in series with the electrochromic device in the circuit. When the electrochromic device is in a complete discharging state, an internal resistance of the electrochromic device may be regarded as "0", and the fixed resistor in the circuit shares a circuit voltage. Along with the charging process, the internal resistance of the electrochromic device is gradually increased, the voltage division of the electrochromic device in the circuit is gradually increased, and finally, the internal resistance of the electrochromic device may be regarded as infinity to share all voltage in the circuit to form the constant voltage charging. The sweeping speed charging and discharging is used, an internal potential of the electrochromic device may gradually rise in a balanced manner, so that the potential difference near the two poles is eliminated, and thus the effect of the uniform color changing is achieved. 11a, in some cases, when the electrochromic device reaches the specified required transmittance range, the charging and discharging of the electrochromic device is stopped. 11b, in some cases, the charging and discharging of the electrochromic device is stopped after the output is performed for the prescribed period of time. 11c, in some cases, when the voltage of the electrochromic device reaches a set value of a preset cutoff voltage, the charging and discharging of the electrochromic device is stopped. 11d, in some cases, multiple detections of 11a-11d are performed, and when indexes in one or any of the above items reach a set value, the charging and discharging of the electrochromic device is stopped. 11e, in some cases, when the voltage of the electrochromic device reaches a set value, the electrochromic device is converted into a constant voltage charging and discharging with a certain voltage, and the output is performed for a specified period of time, the charging and discharging of the electrochromic device is stopped. 11f, in some cases, when the voltage of the electrochromic device reaches the set value, the electrochromic device turns into a constant voltage charging and discharging with a certain voltage, and when the electrochromic device reaches the prescribed transmittance range, the charge and discharge of the electrochromic device is stopped. 11g, in some cases, when the voltage of the electrochromic device reaches the set value, the electrochromic device turns into a constant voltage charging and discharging with a certain voltage, a current generated by the electrochromic device under a linear voltage and a constant voltage is detected through an integrator, and the number of charges is calculated, and when the number of charges satisfies the set number of charges, the charging and discharging of the electrochromic device is stopped. 11h, in some cases, when the voltage of the electrochromic device reaches the set value, the electrochromic device turns into a constant voltage charging and discharging with a certain voltage, the current is detected after the output is performed for the prescribed period of time, and when the current of the electrochromic device reaches a set value or range, the charging and discharging of the electrochromic device is stopped.

In step 120, if the current transmittance of the electrochromic device reaches the preset transmittance, the charging and discharging is suspended, and whether a current open circuit potential of the electrochromic device is within a preset open circuit potential threshold range is continuously monitored.

In this embodiment, if the electrochromic device reaches the preset transmittance range, the charging and discharging is paused, and whether the current open circuit potential of the electrochromic device is within the preset open circuit potential threshold range is continuously monitored.

In step 130, if the current open circuit potential of the electrochromic device is not within the preset open circuit potential threshold range, the external power supply is controlled to perform a second mode charging and discharging on the electrochromic device to enable the current open circuit potential of the electrochromic device to be continuously within the preset open circuit potential threshold range.

In this embodiment, step 130 includes step 131 and step 132.

In step 131, if the current open circuit potential of the electrochromic device is higher than the preset balance potential of the electrochromic device, the current open circuit potential of the electrochromic device is continuously monitored; if the current open circuit potential of the electrochromic device is higher than an upper limit of the preset open circuit potential threshold range, the charging is stopped; and if the current open circuit potential of the electrochromic device is lower than a lower limit of the preset open circuit potential threshold range, a second mode is adopted for the charging until the current open circuit potential reaches the upper limit of the preset open circuit potential threshold range.

In step 132, if the current open circuit potential of the electrochromic device is lower than the preset balance potential of the electrochromic device, the current open circuit potential of the electrochromic device is continuously monitored; if the current open circuit potential of the electrochromic device is lower than a lower limit of the preset open circuit potential threshold range, the charging is stopped; and if the current open circuit potential of the electrochromic device is higher than the upper limit of the preset open circuit potential threshold range, the second mode is adopted for the discharging until the current open circuit potential reaches the lower limit of the preset open circuit potential threshold range.

In this embodiment, whether the electrochromic device belongs to the charging process or the discharging process needs to be firstly determined, and according to the difference between the charging process and the discharging process, conditions for determining whether charging and discharging need to be continued are different. A preset balance potential of the electrochromic device is also referred to as a reversible potential and means that the forward reaction and the reverse reaction of the electrode are the same, that is, the material migration speed and the charge conveying speed in the forward and reverse processes are consistent, and at this time, the current passing through the electrode is equal to zero or infinitely small. A value of the preset balance potential is related to materials of an electrolyte, an electrochromic layer, and an ion storage layer selected by the electrochromic device. According to this embodiment, through the above steps 131 or 130, the open circuit potential of the electrochromic device may be kept in the preset open circuit potential threshold range continuously, and therefore the electrochromic device is kept at the preset transmittance. In this way, in the transmittance maintaining stage, the constant voltage charging does not need to be kept on the electrochromic device for a long time, and the electrochromic device is charged and discharged in the second mode only after the current open circuit potential is not in the preset open circuit potential threshold range, so that the electrochromic device is maintained at the specific transmittance, or at the circulation between different transmittance ranges and the transmittance in any intermediate state, which can reduce the damage to the electrochromic device caused by long-time constant current constant voltage charging and discharging.

In the preset transmittance maintaining stage, the description of the charging and discharging mode examples and effects of the second mode charging and discharging is described in the description of the first mode charging and discharging, and the description is not repeated here.

This embodiment provides a control method, apparatus and equipment for an electrochromic device and a storage medium, the method includes the following steps: it is determined whether a current transmittance of the electrochromic device reaches a preset transmittance; if the current transmittance of the electrochromic device does not reach the preset transmittance, an external power supply is controlled to perform a first mode charging and discharging on the electrochromic device until the current transmittance of the electrochromic device reaches the preset transmittance; if the current transmittance of the electrochromic device reaches the preset transmittance, the charging and discharging is suspended, and it is continuously monitored whether a current open circuit potential of the electrochromic device is within a preset open circuit potential threshold range; and if the current open circuit potential of the electrochromic device is not within the preset open circuit potential threshold range, the external power supply is controlled to perform a second mode charging and discharging on the electrochromic device to enable the current open circuit potential of the electrochromic device to be continuously within the preset open circuit potential threshold range. Through the control method for the electrochromic device provided in the embodiments of the present application, it is determined whether the open circuit potential of the electrochromic device satisfies the preset requirement, and the electrochromic device is charged through various charging manners and determination conditions, so that problems that the electrochromic device in the related art cannot be accurately controlled and is unstable are solved, and thus the uniform color change and the prolonged service life of the electrochromic device are achieved.

Embodiment Two

Figure 2:
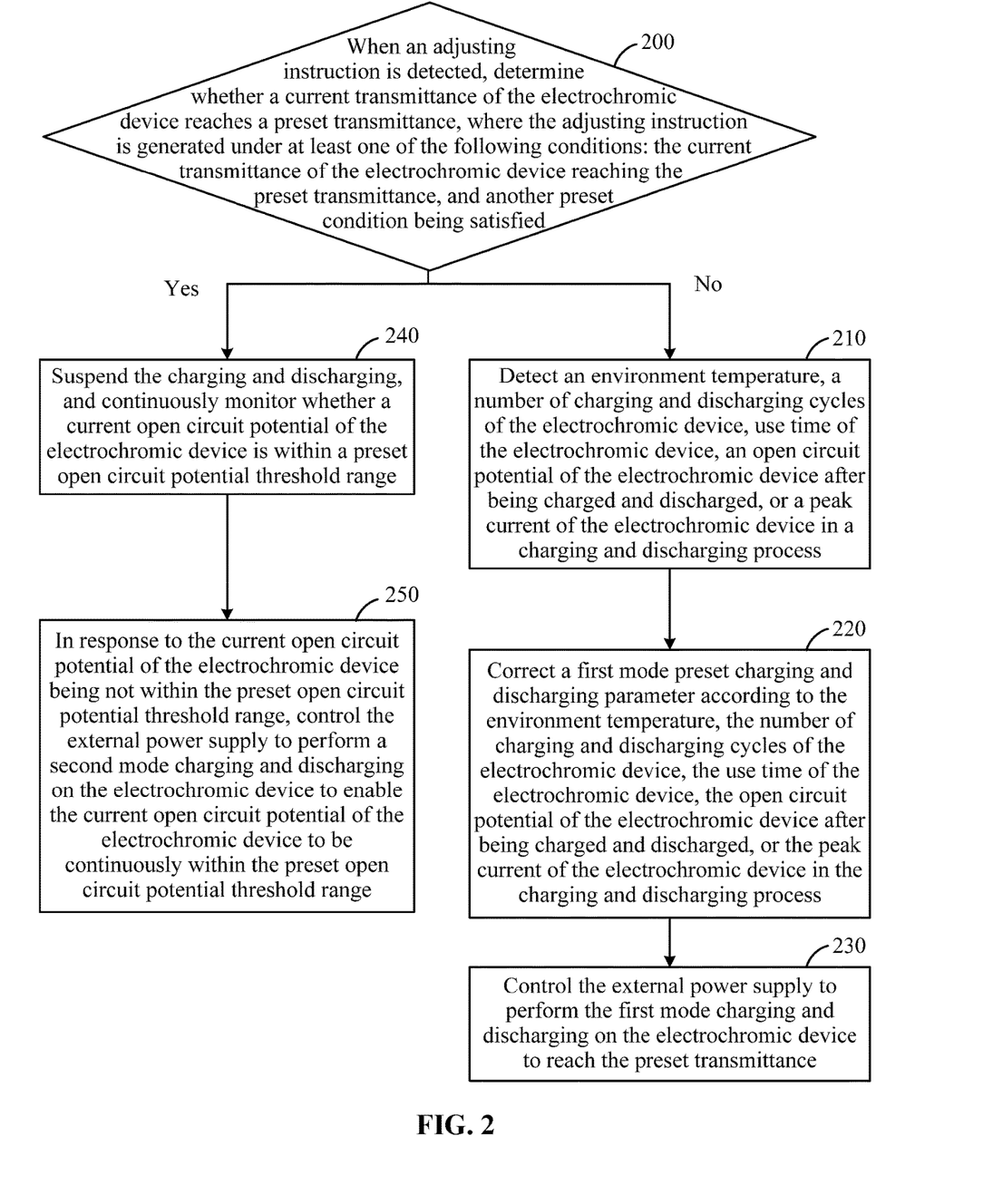
FIG. 2 is a flowchart of a control method for an electrochromic device provided in embodiment two of the present application.

FIG. 2 is a flowchart of a control method for an electrochromic device provided in embodiment two of the present application, this embodiment is applicable to a condition of controlling a transmittance of the electrochromic device to be stable, and the method includes the following steps.

In step 200, when an adjusting instruction is detected, it is determined whether a current transmittance of the electrochromic device reaches a preset transmittance, where the adjusting instruction is generated under at least one of the following conditions: the current transmittance of the electrochromic device reaching the preset transmittance, and another preset condition being satisfied.

In this embodiment, the another preset condition includes one or a combination of the following conditions: when the temperature change exceeds a preset temperature difference range; when the electrochromic device is powered off and restarted; when information for adjusting the transmittance input by a user is received; when a difference value between the current transmittance of the electrochromic device and the preset transmittance is greater than a preset transmittance difference value range; time from the previous adjustment reaches a preset time; when the sunlight intensity and light intensity and the temperature difference all the year round of a position where the user is located change.

In step 210, if the current transmittance of the electrochromic device does not reach the preset transmittance, the environment temperature, the number of charging and discharging cycles of the electrochromic device, use time of the electrochromic device, an open circuit potential of the electrochromic device after being charged and discharged, or a peak current of the electrochromic device in the charging and discharging process is detected.

In this embodiment, in order to realize the accurate adjustment of the transmittance of the electrochromic device, the environment temperature of the electrochromic device, the use time of the electrochromic device, the number of cycles, a peak current of the electrochromic device within a fixed voltage time period, and an open circuit potential of the device after charging and discharging time are detected; and a first mode preset charging and discharging parameter is adjusted by detecting multiple parameters described above.

In step 220, a first mode preset charging and discharging parameter is corrected according to the environment temperature, the number of charging and discharging cycles of the electrochromic device, the use time of the electrochromic device, the open circuit potential of the electrochromic device after being charged and discharged, or the peak current of the electrochromic device during the charging and discharging.

In this embodiment, the performance of the electrochromic device may be changed under the condition that the temperature and the service life are changed. Exemplarily, the electrochromic device at high temperature is more susceptible to degradation or damage of the performance of the device by excessive oxidation reactions. In order to prevent this situation, a logic control panel may collect real-time data of an external temperature sensor and thus determine an external environment where the device is located, and after an instruction to adjust a transmittance range is received, the logic control panel properly reduces a set transmission charge value, or shortens the constant voltage and constant current charging time according to an internal algorithm. The logic control panel may automatically adjust and set the transmittance range and highest and lowest thresholds of the open circuit potential according to a value of the external temperature, so that the attenuation or damage caused by excessive oxidation of the electrochromic device at high temperature is avoided. In some cases, the logic control panel determines the external environment of the electrochromic device by detecting a magnitude of the charging or discharging current under a specific voltage, and after an instruction to adjust the transmittance range is received, the logic control panel appropriately reduces the set transmission charge value, or shortens the constant voltage and constant current charging time according to an internal algorithm, and automatically adjusts the set transmittance range and the highest and lowest thresholds of the open circuit potential, so that the attenuation or damage caused by an excessive oxidation of the electrochromic device at high temperature is avoided. Exemplarily, the electrochromic device generally achieves a color-changing function through the movement of lithium ions between an electrolyte and an electrochromic material. When a forward voltage is applied to the electrochromic device, lithium ions are driven to move from the ion conductor/electrolyte to be embedded into the electrochromic material. Moreover, a compensation charge will escape from the counter electrode, and the charge compensation electrons will flow from an external circuit and be embedded into the electrochromic material to maintain the charge neutrality. Along with the increase of recycling time, in the later period of the service life of the electrochromic device, due to the accumulation of Faraday charge loss, the embedding and removing processes of ions in the electrochromic material become more difficult, and at this time, the requirement for adjusting the transmittance range needs to be satisfied by increasing the output voltage or current. The logic control panel may determine the performance of the electrochromic device by detecting a magnitude of the charge or discharge peak current under a specific voltage and the open circuit potential value of the electrochromic device after the charging and discharging, and when it is detected that the current or the open circuit potential value of the electrochromic device after the charging and discharging is less than a set threshold, the logic control panel needs to modify the output voltage or current value of the electrochromic device or change the output time according to the built-in algorithms such as the use time and the number of cycles of the electrochromic device, so as to ensure the requirement of adjusting the set transmittance range. The capacity and the area of the electrochromic device are closely related with the transmittance and the open circuit potential, and the logic control panel outputs, by automatically identifying the sizes of different electrochromic devices, voltage or current according to a corresponding logic control algorithm and by combining the device operation environment, so that the function of rapidly and uniformly adjusting the transmittance of the electrochromic device within the specified service life of the electrochromic device is ensured.

In step 230, the external power supply is controlled to perform the first mode charging and discharging on the electrochromic device to reach the preset transmittance.

In this embodiment, when the electrochromic device reaches the preset transmittance, the electrochromic device enters a transmittance maintaining stage.

In step 240, if the current transmittance of the electrochromic device reaches the preset transmittance, the charging and discharging is suspended, and it is continuously monitored whether a current open circuit potential of the electrochromic device is within a preset open circuit potential threshold range.

In step 250, if the current open circuit potential of the electrochromic device is not within the preset open circuit potential threshold range, the external power supply is controlled to perform a second mode charging and discharging on the electrochromic device to enable the current open circuit potential of the electrochromic device to be continuously within the preset open circuit potential threshold range.

An embodiment of the present application provides a control method for an electrochromic device. The method includes the following steps: when the adjusting instruction is detected, it is determined whether the current transmittance of the electrochromic device reaches the preset transmittance, where the adjusting instruction is generated under at least one of the following conditions: the current transmittance of the electrochromic device reaching the preset transmittance, and another preset condition being satisfied; if the current transmittance of the electrochromic device does not reach the preset transmittance, the environment temperature, the number of charging and discharging cycles of the electrochromic device, the use time of the electrochromic device, the open circuit potential of the electrochromic device after being charged and discharged, or the peak current of the electrochromic device during the charging and discharging is detected; the first mode preset charging and discharging parameter is corrected according to the environment temperature, the number of charging and discharging cycles of the electrochromic device, the use time of the electrochromic device, the open circuit potential of the electrochromic device after being charged and discharged, or the peak current of the electrochromic device during the charging and discharging; the external power supply is controlled to perform the first mode charging and discharging on the electrochromic device to reach the preset transmittance; if the current transmittance of the electrochromic device reaches the preset transmittance, the charging and discharging is suspended, and it is continuously monitored whether the current open circuit potential of the electrochromic device is within the preset open circuit potential threshold range; and if the current open circuit potential of the electrochromic device is not within the preset open circuit potential threshold range, the external power supply is controlled to perform the second mode charging and discharging on the electrochromic device to enable the current open circuit potential of the electrochromic device to be continuously within the preset open circuit potential threshold range. Through the control method for the electrochromic device provided in the embodiments of the present application, it is determined whether the open circuit potential of the electrochromic device satisfies the preset requirement, and the electrochromic device is charged through various charging manners and determination conditions, so that problems that the electrochromic device in the related art cannot be accurately controlled and is unstable are solved, and thus the uniform color change and the prolonged service life of the electrochromic device are achieved.

Embodiment Three

Figure 3:
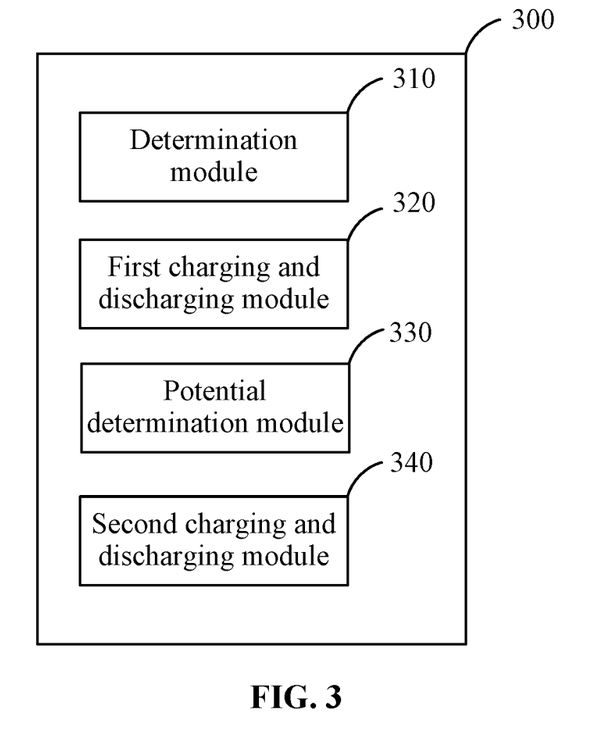
FIG. 3 is a structural schematic diagram of a control apparatus for an electrochromic device provided in embodiment three of the present application.

A control apparatus for the electrochromic device provided in the embodiments of the present application can execute the control method for the electrochromic device provided in any of the embodiments of the present application, and has a function module and an effect corresponding to the executed method. FIG. 3 is a structural schematic diagram of a control apparatus 300 for an electrochromic device provided in embodiment three of the present application. Referring to FIG. 3, the control apparatus 300 for the electrochromic device provided in an embodiment of the present application may include a determination module 310, a first charging and discharging module 320, a potential determination module 330 and a second charging and discharging module 340.

The determination module 310 is configured to determine whether a current transmittance of the electrochromic device reaches a preset transmittance. The first charging and discharging module 320 is configured to control an external power supply to perform a first mode charging and discharging on the electrochromic device until the current transmittance of the electrochromic device reaches the preset transmittance. The potential determination module 330 is configured to suspend the charging and discharging, and continuously monitor whether a current open circuit potential of the electrochromic device is within a preset open circuit potential threshold range. The second charging and discharging module 340 is configured to, when the current open circuit potential of the electrochromic device is not within the preset open circuit potential threshold range, control the external power supply to perform a second mode charging and discharging on the electrochromic device to enable the current open circuit potential of the electrochromic device to be continuously within the preset open circuit potential threshold range.

Optionally, the step that it is determined whether the current transmittance of the electrochromic device reaches the preset transmittance includes: when an adjusting instruction is detected, it is determined whether the current transmittance of the electrochromic device reaches the preset transmittance, where the adjusting instruction is generated under at least one of the following conditions: the current transmittance of the electrochromic device reaching the preset transmittance, and another preset condition being satisfied.

Optionally, the second charging and discharging module 340 is further configured to perform the following steps: it is determined whether a current open circuit potential of the electrochromic device is higher than a preset balance potential of the electrochromic device; if the current open circuit potential of the electrochromic device is higher than the preset balance potential of the electrochromic device, the current open circuit potential of the electrochromic device is continuously monitored; if the current open circuit potential of the electrochromic device is higher than an upper limit of the preset open circuit potential threshold range, the charging is stopped; and if the current open circuit potential of the electrochromic device is lower than a lower limit of the preset open circuit potential threshold range, a second mode is adopted for the charging until the current open circuit potential reaches the upper limit of the preset open circuit potential threshold range; if the current open circuit potential of the electrochromic device is not higher than the preset balance potential of the electrochromic device, the current open circuit potential of the electrochromic device is continuously monitored; if the current open circuit potential of the electrochromic device is lower than the lower limit of the preset open circuit potential threshold range, the discharging is stopped; and if the current open circuit potential of the electrochromic device is higher than the upper limit of the preset open circuit potential threshold range, the second mode is adopted for the discharging until the current open circuit potential reaches the lower limit of the preset open circuit potential threshold range.

Optionally, the first charging and discharging module 320 is further configured to perform the following steps: an ambient temperature is detected; a first mode preset charging and discharging parameter is corrected according to the environment temperature; and the external power supply is controlled to perform the first mode charging and discharging on the electrochromic device to reach the preset transmittance.

Optionally, the first charging and discharging module 320 is further configured to perform the following steps: the number of charging and discharging cycles of the electrochromic device, use time of the electrochromic device, an open circuit potential of the electrochromic device after being charged and discharged, or a peak current of the electrochromic device during the charging and discharging is detected; a first mode preset charging and discharging parameter is corrected according to the number of charging and discharging cycles of the electrochromic device, the use time of the electrochromic device, the open circuit potential of the electrochromic device after being charged and discharged, or the peak current of the electrochromic device during the charging and discharging; and the external power supply is controlled to perform the first mode charging and discharging on the electrochromic device to reach the preset transmittance.

Optionally, the manner of determining whether the current transmittance of the electrochromic device reaches the preset transmittance includes: the charging and discharging charge number of the electrochromic device reaching a preset value; an open circuit potential of the electrochromic device reaching an open circuit potential corresponding to the preset transmittance; constant voltage or constant current output time of the electrochromic device reaching a preset time; or an output current of the electrochromic device being less than a preset cut-off current.

Optionally, the preset condition includes: the charging and discharging charge number of the electrochromic device reaching the preset value, the transmittance of the electrochromic device reaching a preset transmittance range, the output time of the electrochromic device reaching the preset time, or the current of the electrochromic device reaching a preset current.

Optionally, the first mode charging and discharging or the second mode charging and discharging includes at least one of: a constant voltage charging and discharging, a constant current charging and discharging, a pulse charging and discharging, and a sweeping speed charging and discharging.

This embodiment provides a control apparatus for an electrochromic device, the apparatus includes a determination module, a first charging and discharging module, a potential determination module and a second charging and discharging module. The determination module is configured to determine whether a current transmittance of the electrochromic device reaches a preset transmittance. The first charging and discharging module is configured to control an external power supply to perform a first mode charging and discharging on the electrochromic device until the current transmittance of the electrochromic device reaches the preset transmittance. The potential determination module is configured to suspend the charging and discharging, and continuously monitor whether a current open circuit potential of the electrochromic device is within a preset open circuit potential threshold range. The second charging and discharging module is configured to, when the current open circuit potential of the electrochromic device is not within the preset open circuit potential threshold range, control the external power supply to perform a second mode charging and discharging on the electrochromic device to enable the current open circuit potential of the electrochromic device to be continuously within the preset open circuit potential threshold range. In the control apparatus for the electrochromic device provided in the embodiments of the present application, it is determined whether the open circuit potential of the electrochromic device satisfies the preset requirement, and the electrochromic device is charged through various charging manners and determination conditions, so that problems that the electrochromic device in the related art cannot be accurately controlled and is unstable are solved, and thus the uniform color change and the prolonged service life of the electrochromic device are achieved.

Embodiment Four

Figure 4:
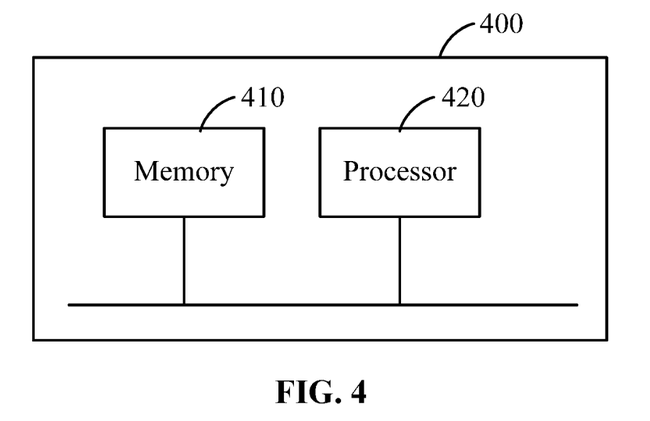
FIG. 4 is a structural schematic diagram of a dimming equipment provided in embodiment four of the present application.

FIG. 4 is a structural schematic diagram of a dimming equipment provided in embodiment four of the present application. As shown in FIG. 4, the dimming equipment 400 includes a memory 410 and a processor 420. One or more processors 420 in the dimming device 400 may be provided, and one processor 420 is used as an example in FIG. 4. The memory 410 and the processor 420 in the dimming equipment may be connected by a bus or other manners, and FIG. 4 shows the connection by the bus as an example.

As a computer readable storage medium, the memory 410 may be configured to store software programs, computer executable programs, and modules, such as a program instruction/module (such as, the determination module 310, the first charging and discharging module 320, the potential determination module 330, the second charging and discharging module 340 in the control apparatus for the electrochromic device) corresponding to the control method for the electrochromic device in the embodiments of the present application. The processor 420 executes various functional applications of the apparatus/terminal/equipment and data processing by running software programs, instructions, and modules stored in the memory 410, that is, achieves the control method for the electrochromic device described above.

The processor 420 is configured to run computer programs stored in the memory 410, so that the following steps are performed. It is determined whether a current transmittance of the electrochromic device reaches a preset transmittance; the current transmittance of the electrochromic device does not reach the preset transmittance, an external power supply is controlled to perform a first mode charging and discharging on the electrochromic device until the current transmittance of the electrochromic device reaches the preset transmittance; if the current transmittance of the electrochromic device reaches the preset transmittance, the charging and discharging is suspended, and it is continuously monitored whether a current open circuit potential of the electrochromic device is within a preset open circuit potential threshold range; and if the current open circuit potential of the electrochromic device is not within the preset open circuit potential threshold range, the external power supply is controlled to perform a second mode charging and discharging on the electrochromic device to enable the current open circuit potential of the electrochromic device to be continuously within the preset open circuit potential threshold range.

In an embodiment, in the dimming equipment 400 provided in the embodiments of the present application, the computer program of this dimming equipment 400 is not limited to the operation of the method described above, may also perform related operations in the control method for the electrochromic device provided in any of the embodiments of the present application.

The memory 410 may mainly include a storage program region and a storage data region. The storage program region may store an operating system, and an application program required for at least one function. The storage data region may store data created according to the use of the terminal. Moreover, the memory 410 may include a high-speed random access memory, or may include a non-volatile memory, such as at least one disk storage device, a flash memory device, or other non-volatile solid-state storage device. In some instances, the memory 410 may include a memory remotely set relative to the processor 420, which may be connected to the apparatus/terminal/equipment over a network. Instances of the above network includes, but is not limited to, the Internet, intranets, LANs, mobile communication networks and combinations thereof.

This embodiment provides a control apparatus for an electrochromic device, the control apparatus is configured to perform the following steps: it is determined whether a current transmittance of the electrochromic device reaches a preset transmittance; if the current transmittance of the electrochromic device does not reach the preset transmittance, an external power supply is controlled to perform a first mode charging and discharging on the electrochromic device until the current transmittance of the electrochromic device reaches the preset transmittance; if the current transmittance of the electrochromic device reaches the preset transmittance, the charging and discharging is suspended, and it is continuously monitored whether a current open circuit potential of the electrochromic device is within a preset open circuit potential threshold range; and if the current open circuit potential of the electrochromic device is not within the preset open circuit potential threshold range, the external power supply is controlled to perform a second mode charging and discharging on the electrochromic device to enable the current open circuit potential of the electrochromic device to be continuously within the preset open circuit potential threshold range. It is determined whether the open circuit potential of the electrochromic device satisfies the preset requirement, and the electrochromic device is charged through various charging manners and determination conditions, so that problems that the electrochromic device in the related art cannot be accurately controlled and is unstable are solved, and thus the uniform color change and the prolonged service life of the electrochromic device are achieved.

Embodiment Five

Embodiment five of the present application further provides a storage medium containing a computer executable instruction, the computer executable instruction is configured to, when executed by a computer processor, perform the method for the electrochromic device, and the method includes steps described below.

It is determined whether a current transmittance of the electrochromic device reaches a preset transmittance. If the current transmittance of the electrochromic device does not reach the preset transmittance, an external power supply is controlled to perform a first mode charging and discharging on the electrochromic device until the current transmittance of the electrochromic device reaches the preset transmittance. If the current transmittance of the electrochromic device reaches the preset transmittance, the charging and discharging is suspended, and it is continuously monitored whether a current open circuit potential of the electrochromic device is within a preset open circuit potential threshold range. If the current open circuit potential of the electrochromic device is not within the preset open circuit potential threshold range, the external power supply is controlled to perform a second mode charging and discharging on the electrochromic device to enable the current open circuit potential of the electrochromic device to be continuously within the preset open circuit potential threshold range.

In the storage medium containing the computer executable instruction provided in the embodiments of the present application, the computer executable instruction of the storage medium is not limited to the operation of the method described above, may also perform related operations in the control method for the electrochromic device provided in any of the embodiments of the present application.

The computer storage medium of the embodiments of the present application may adopt any one or a combination of computer-readable media. The computer-readable medium may be a computer-readable signal medium or a computer-readable storage medium. The computer-readable storage medium may be, for example, but not limited to, an electronic, magnetic, optical, electromagnetic, infrared, or semiconductor system, apparatus, or device, or any combination of the foregoing. Examples (a non-exhaustive list) of the computer-readable storage medium include: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In this context, the computer-readable storage medium may be any tangible medium that contains or stores a program for use by or in connection with an instruction execution system, apparatus, or device.

The computer-readable signal medium may include a propagated data signal with a computer-readable program code carried therein, for example, in a baseband or as part of a carrier wave. Such a propagated data signal may adopt a variety of forms, including, but not limited to: an electromagnetic signal, an optical signal, or any suitable combination of the foregoing. The computer-readable signal medium may be any computer-readable medium that is not a computer-readable storage medium and that may transmit, propagate, or transport a program for use by or in connection with an instruction execution system, apparatus, or device.

Program codes embodied on the computer-readable medium may be transmitted using any appropriate medium, including but not limited to: wireless, wire, optic cable, RF, etc., or any suitable combination of the foregoing.

A computer program code for performing the operations of the present application may be written in one or more programming languages or combinations thereof, the described programming languages include an object-oriented programming language—such as Java, Smalltalk, C++, and further include a conventional procedural programming language—such as a "C" language or similar programming language. The program code may be executed in the following manners: executed entirely on a user's computer, executed partly on the user's computer, executed as an independent software package, executed partly on the user's computer and partly on a remote computer, or executed entirely on the remote computer or a server. In a case where the remote computer is involved, the remote computer may be connected to the user's computer through any kind of network, including a local area network (LAN) or a wide area network (WAN), or may be connected to an external computer (for example, connected to the external computer through an internet provided by an internet service provider).

This embodiment provides a storage medium for an electrochromic device, the storage medium is configured to perform the following steps: it is determined whether a current transmittance of the electrochromic device reaches a preset transmittance; if the current transmittance of the electrochromic device does not reach the preset transmittance, an external power supply is controlled to perform a first mode charging and discharging on the electrochromic device until the current transmittance of the electrochromic device reaches the preset transmittance; if the current transmittance of the electrochromic device reaches the preset transmittance, the charging and discharging is suspended, and it is continuously monitored whether a current open circuit potential of the electrochromic device is within a preset open circuit potential threshold range; and if the current open circuit potential of the electrochromic device is not within the preset open circuit potential threshold range, the external power supply is controlled to perform a second mode charging and discharging on the electrochromic device to enable the current open circuit potential of the electrochromic device to be continuously within the preset open circuit potential threshold range. In the storage medium for the electrochromic device provided in the embodiments of the present application, it is determined whether the open circuit potential of the electrochromic device satisfies the preset requirement, and the electrochromic device is charged through various charging manners and determination conditions, so that problems that the electrochromic device in the related art cannot be accurately controlled and is unstable are solved, and thus the uniform color change and the prolonged service life of the electrochromic device are achieved.

What is claimed is:

1. A control method for an electrochromic device, comprising:
   determining whether a current transmittance of the electrochromic device reaches a preset transmittance;
   in response to determining that the current transmittance of the electrochromic device does not reach the preset transmittance, controlling an external power supply to perform a first mode charging and discharging on the electrochromic device until the current transmittance of the electrochromic device reaches the preset transmittance;
   in response to determining that the current transmittance of the electrochromic device reaches the preset transmittance, suspending the charging and discharging, and continuously monitoring whether a current open circuit potential of the electrochromic device is within a preset open circuit potential threshold range; and
   in response to the current open circuit potential of the electrochromic device being not within the preset open circuit potential threshold range, controlling the external power supply to perform a second mode charging and discharging on the electrochromic device to enable the current open circuit potential of the electrochromic device to be continuously within the preset open circuit potential threshold range;
   wherein in response to the current open circuit potential of the electrochromic device being not within the preset open circuit potential threshold range, controlling the external power supply to perform the second mode charging and discharging on the electrochromic device to enable the current open circuit potential of the electrochromic device to be continuously within the preset open circuit potential threshold range comprises:
   determining whether a current open circuit potential of the electrochromic device is higher than a preset balance potential of the electrochromic device;
   in response to determining that the current open circuit potential of the electrochromic device is higher than the preset balance potential, continuously monitoring the current open circuit potential of the electrochromic device; in response to the monitored current open circuit potential of the electrochromic device being higher than an upper limit of the preset open circuit potential threshold range, stopping the charging; and in response to the monitored current open circuit potential of the electrochromic device being lower than a lower limit of the preset open circuit potential threshold range, adopting the second mode for the charging until the current open circuit potential reaches the upper limit of the preset open circuit potential threshold range; and
   in response to determining that the current open circuit potential of the electrochromic device is not higher than the preset balance potential, continuously monitoring the current open circuit potential of the electrochromic device; in response to the monitored current open circuit potential of the electrochromic device being lower than the lower limit of the preset open circuit potential threshold range, stopping the discharging; and in response to the monitored current open circuit potential of the electrochromic device being higher than the upper limit of the preset open circuit potential threshold range, adopting the second mode for the discharging until the current open circuit potential reaches the lower limit of the preset open circuit potential threshold range.

2. The method of claim 1, wherein determining whether the current transmittance of the electrochromic device reaches the preset transmittance comprises:
   in response to detecting an adjusting instruction, determining whether the current transmittance of the electrochromic device reaches the preset transmittance, wherein the adjusting instruction is generated under at least one of the following conditions: the current transmittance of the electrochromic device reaching the preset transmittance, or a preset condition being satisfied.

3. The method of claim 1, wherein controlling the external power supply to perform the first mode charging and discharging on the electrochromic device until the current transmittance of the electrochromic device reaches the preset transmittance comprises:
   detecting an ambient temperature;
   correcting a first mode preset charging and discharging parameter according to the environment temperature; and
   controlling, according to the corrected first mode preset charging and discharging parameter, the external power supply to perform the first mode charging and discharging on the electrochromic device to reach the preset transmittance.

4. The method of claim 1, wherein controlling the external power supply to perform the first mode charging and discharging on the electrochromic device until the current transmittance of the electrochromic device reaches the preset transmittance comprises:
   detecting a number of charging and discharging cycles of the electrochromic device, use time of the electrochromic device, an open circuit potential of the electrochromic device after being charged and discharged, or a peak current of the electrochromic device during the charging and discharging;
   correcting a first mode preset charging and discharging parameter according to the detected number of charging and discharging cycles of the electrochromic device, the use time of the electrochromic device, the open circuit potential of the electrochromic device after being charged and discharged, or the peak current of the electrochromic device during the charging and discharging; and controlling, according to the corrected first mode preset charging and discharging parameter, the external power supply to perform the first mode charging and discharging on the electrochromic device to reach the preset transmittance.

5. The method of claim 1, wherein determining whether the current transmittance of the electrochromic device reaches the preset transmittance comprises one of:

determining whether a charging and discharging charge number of the electrochromic device reaches a preset value;

determining whether an open circuit potential of the electrochromic device reaches an open circuit potential corresponding to the preset transmittance;

determining whether constant voltage or constant current output time of the electrochromic device reaches a preset time; or determining whether an output current of the electrochromic device is less than a preset cut-off current.

6. The method of claim 1, wherein the first mode charging and discharging or the second mode charging and discharging comprises at least one of: a constant voltage charging and discharging, a constant current charging and discharging, a pulse charging and discharging, or a sweep speed charging and discharging.

7. A non-transitory computer-readable storage medium, storing a computer program, wherein the non-transitory computer program comprises a program instruction, wherein the program instruction, when executed by a processor, implements the control method for the electrochromic device of claim 1.

8. A control apparatus for an electrochromic device, comprising:

a determination module, which is configured to determine whether a current transmittance of the electrochromic device reaches a preset transmittance;

a first charging and discharging module, which is configured to, in response to determining that the current transmittance of the electrochromic device does not reach the preset transmittance, control an external power supply to perform a first mode charging and discharging on the electrochromic device until the current transmittance of the electrochromic device reaches the preset transmittance;

a potential determination module, which is configured to, in response to determining that the current transmittance of the electrochromic device reaches the preset transmittance, suspend the charging and discharging, continuously monitor whether a current open circuit potential of the electrochromic device is within a preset open circuit potential threshold range; and a second charging and discharging module, which is configured to, in response to the current open circuit potential of the electrochromic device being not within the preset open circuit potential threshold range, control the external power supply to perform a second mode charging and discharging on the electrochromic device to enable the current open circuit potential of the electrochromic device to be continuously within the preset open circuit potential threshold range.

9. The control apparatus for an electrochromic device of claim 8, wherein the second charging and discharging module, which is configured to, in response to the current open circuit potential of the electrochromic device being not within the preset open circuit potential threshold range, control the external power supply to perform a second mode charging and discharging on the electrochromic device to enable the current open circuit potential of the electrochromic device to be continuously within the preset open circuit potential threshold range in the following manner:

determining whether a current open circuit potential of the electrochromic device is higher than a preset balance potential of the electrochromic device;

in response to determining that the current open circuit potential of the electrochromic device is higher than the preset balance potential, continuously monitoring the current open circuit potential of the electrochromic device; in response to the monitored current open circuit potential of the electrochromic device being higher than an upper limit of the preset open circuit potential threshold range, stopping the charging; and in response to the monitored current open circuit potential of the electrochromic device being lower than a lower limit of the preset open circuit potential threshold range, adopting the second mode for the charging until the current open circuit potential reaches the upper limit of the preset open circuit potential threshold range; and in response to determining that the current open circuit potential of the electrochromic device is not higher than the preset balance potential, continuously monitoring the current open circuit potential of the electrochromic device; in response to the monitored current open circuit potential of the electrochromic device being lower than the lower limit of the preset open circuit potential threshold range, stopping the discharging; and in response to the monitored current open circuit potential of the electrochromic device being higher than the upper limit of the preset open circuit potential threshold range, adopting the second mode for the discharging until the current open circuit potential reaches the lower limit of the preset open circuit potential threshold range.

10. The control apparatus for an electrochromic device of claim 8, wherein the first charging and discharging module is further configured to perform the following steps:

detecting an ambient temperature;

correcting a first mode preset charging and discharging parameter according to the environment temperature; and controlling, according to the corrected first mode preset charging and discharging parameter, the external power supply to perform the first mode charging and discharging on the electrochromic device to reach the preset transmittance.

11. A dimming equipment, comprising:

at least one processor;

a storage apparatus, which is configured to store at least one program;

wherein the at least one program is executed by the at least one processor, and the at least one processor is configured to:

determine whether a current transmittance of the electrochromic device reaches a preset transmittance;

in response to determining that the current transmittance of the electrochromic device does not reach the preset transmittance, control an external power supply to perform a first mode charging and discharging on the electrochromic device until the current transmittance of the electrochromic device reaches the preset transmittance;

in response to determining that the current transmittance of the electrochromic device reaches the preset transmittance, suspend the charging and discharging, and continuously monitor whether a current open circuit potential of the electrochromic device is within a preset open circuit potential threshold range; and in response to the current open circuit potential of the electrochromic device being not within the preset open circuit potential threshold range, control the external power supply to perform a second mode charging and discharging on the electrochromic device to enable the current open circuit potential of the electrochromic device to be continuously within the preset open circuit potential threshold range;

wherein the at least one processor is configured to, in response to the current open circuit potential of the electrochromic device being not within the preset open circuit potential threshold range, control the external power supply to perform the second mode charging and discharging on the electrochromic device to enable the current open circuit potential of the electrochromic device to be continuously within the preset open circuit potential threshold range in the following manner:

determining whether a current open circuit potential of the electrochromic device is higher than a preset balance potential of the electrochromic device;

in response to determining that the current open circuit potential of the electrochromic device is higher than the preset balance potential, continuously monitoring the current open circuit potential of the electrochromic device; in response to the monitored current open circuit potential of the electrochromic device being higher than an upper limit of the preset open circuit potential threshold range, stopping the charging; and in response to the monitored current open circuit potential of the electrochromic device being lower than a lower limit of the preset open circuit potential threshold range, adopting the second mode for the charging until the current open circuit potential reaches the upper limit of the preset open circuit potential threshold range; and in response to determining that the current open circuit potential of the electrochromic device is not higher than the preset balance potential, continuously monitoring the current open circuit potential of the electrochromic device; in response to the monitored current open circuit potential of the electrochromic device being lower than the lower limit of the preset open circuit potential threshold range, stopping the discharging; and in response to the monitored current open circuit potential of the electrochromic device being higher than the upper limit of the preset open circuit potential threshold range, adopting the second mode for the discharging until the current open circuit potential reaches the lower limit of the preset open circuit potential threshold range.

12. The dimming equipment of claim 11, wherein the at least one processor is configured to determine whether the current transmittance of the electrochromic device reaches the preset transmittance in the following manner:

in response to detecting an adjusting instruction, determining whether the current transmittance of the electrochromic device reaches the preset transmittance, wherein the adjusting instruction is generated under at least one of the following conditions: the current transmittance of the electrochromic device reaching the preset transmittance, or a preset condition being satisfied.

13. The dimming equipment of claim 11, wherein the at least one processor is configured to control the external power supply to perform the first mode charging and discharging on the electrochromic device until the current transmittance of the electrochromic device reaches the preset transmittance in the following manner:

detecting an ambient temperature;

correcting a first mode preset charging and discharging parameter according to the environment temperature; and controlling, according to the corrected first mode preset charging and discharging parameter, the external power supply to perform the first mode charging and discharging on the electrochromic device to reach the preset transmittance.

14. The dimming equipment of claim 11, wherein the at least one processor is configured to control the external power supply to perform the first mode charging and discharging on the electrochromic device until the current transmittance of the electrochromic device reaches the preset transmittance in the following manner:

detecting a number of charging and discharging cycles of the electrochromic device, use time of the electrochromic device, an open circuit potential of the electrochromic device after being charged and discharged, or a peak current of the electrochromic device during the charging and discharging;

correcting a first mode preset charging and discharging parameter according to the detected number of charging and discharging cycles of the electrochromic device, the use time of the electrochromic device, the open circuit potential of the electrochromic device after being charged and discharged, or the peak current of the electrochromic device during the charging and discharging; and controlling, according to the corrected first mode preset charging and discharging parameter, the external power supply to perform the first mode charging and discharging on the electrochromic device to reach the preset transmittance.

15. The dimming equipment of claim 11, wherein the at least one processor is configured to determine whether the current transmittance of the electrochromic device reaches the preset transmittance in one of the following manners:

determining whether a charging and discharging charge number of the electrochromic device reaches a preset value;

determining whether an open circuit potential of the electrochromic device reaches an open circuit potential corresponding to the preset transmittance;

determining whether constant voltage or constant current output time of the electrochromic device reaches a preset time; or determining whether an output current of the electrochromic device is less than a preset cut-off current.

16. The dimming equipment of claim 11, wherein the first mode charging and discharging or the second mode charging and discharging comprises at least one of: a constant voltage charging and discharging, a constant current charging and discharging, a pulse charging and discharging, or a sweep speed charging and discharging.

* * * * *